(12) United States Patent
Gatzke et al.

(10) Patent No.: US 10,552,801 B2
(45) Date of Patent: Feb. 4, 2020

(54) HARD STOP INDICATOR IN A COLLABORATION SESSION

(71) Applicant: CISCO TECHNOLOGY, INC., San Jose, CA (US)

(72) Inventors: Alan D. Gatzke, Bainbridge Island, WA (US); William Chen, Sammamish, WA (US); Kian Shahla, Bellevue, WA (US)

(73) Assignee: Cisco Technology, Inc., San Jose, CA (US)

( * ) Notice: Subject to any disclaimer, the term of this patent is extended or adjusted under 35 U.S.C. 154(b) by 398 days.

(21) Appl. No.: 15/277,848

(22) Filed: Sep. 27, 2016

(65) Prior Publication Data

US 2018/0089636 A1 Mar. 29, 2018

(51) Int. Cl.
*G06Q 10/10* (2012.01)

(52) U.S. Cl.
CPC .................. *G06Q 10/1095* (2013.01)

(58) Field of Classification Search
CPC ....... G06F 3/0484; G06Q 10/00; G06Q 99/00
USPC ............................................... 705/7.11–7.42
See application file for complete search history.

(56) References Cited

U.S. PATENT DOCUMENTS

| 5,933,141 | A | * | 8/1999 | Smith | ............. | G06F 3/0481 |
| | | | | | | 725/39 |
| 8,577,974 | B2 | | 11/2013 | Paulsami et al. | | |
| 9,118,612 | B2 | | 8/2015 | Fish et al. | | |
| 2008/0022209 | A1 | | 1/2008 | Lyle | | |
| 2010/0235214 | A1 | * | 9/2010 | Wood | ............. | G06Q 10/06314 |
| | | | | | | 705/7.24 |
| 2012/0254764 | A1 | * | 10/2012 | Ayloo | .............. | G06Q 50/01 |
| | | | | | | 715/738 |
| 2013/0185368 | A1 | * | 7/2013 | Nordstrom | ........ | H04L 29/08072 |
| | | | | | | 709/206 |
| 2015/0154291 | A1 | | 6/2015 | Shepherd et al. | | |

(Continued)

FOREIGN PATENT DOCUMENTS

WO WO-2019056001 A1 * 3/2019 ......... H04L 12/1813

OTHER PUBLICATIONS

Wu, Wenjun; Fox, Geoffrey C.; Bulut, Hasan; Uyar, Ahmet; and Altay, Harun, "Design and Implementation of a Collaboration WebServices System" (2004). Electrical Engineering and Computer Science. 91. (Year: 2004).*

*Primary Examiner* — Alan S Miller
*Assistant Examiner* — Jay-Ming Wang

(57) ABSTRACT

A method is described and in one embodiment includes requesting from a calendaring system calendaring information for a participant in an online collaboration session, wherein the calendaring information includes free/busy information for the participant; receiving the requested calendaring information; verifying based on processing of the received calendaring information that the participant has a hard stop relative to an end of the online collaboration session, wherein the hard stop is a point in time at which the participant can no longer participate in the online collaboration session; and presenting on a display of user equipment associated with the online collaboration system a hard stop indicator for the participant a first amount of time prior to the hard stop, wherein the hard stop indicator is displayed proximate a representation of the participant.

20 Claims, 7 Drawing Sheets

(56) References Cited

U.S. PATENT DOCUMENTS

2015/0200978 A1     7/2015   Putterman et al.
2015/0347982 A1*   12/2015   Jon .................... G06Q 10/1095
                                                                                  705/7.19

\* cited by examiner

HARD STOP INDICATOR IN A COLLABORATION SESSION

TECHNICAL FIELD

The present disclosure relates generally to network systems and, more particularly, to a hard stop indicator in a collaboration session using such systems.

BACKGROUND

Often during a collaboration session (e.g., Cisco Telepresence™, Cisco WebEx™, Cisco Spark™), one or more participants are able to continue the discussion past the meeting's scheduled end time, while others may have a "hard stop," meaning they have to leave the meeting at the scheduled end time. The fact that a participant has a hard stop is useful to other participants for a variety of reasons, not the least of which is that it may prompt the meeting moderator and/or other participants to focus on particular issues before the scheduled meeting end. While participants who have a hard stop may mention that fact at the beginning of the meeting or may bring it to the attention of the other participants shortly before the participant must depart the meeting, they may neglect to do so for a variety of reasons, such as forgetfulness or a desire to avoid appearing rude or abrupt by interrupting the discussion to make note of their impending need to depart the meeting.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

A method is described and in one embodiment includes requesting from a calendaring system calendaring information for a participant in an online collaboration session, wherein the calendaring information includes free/busy information for the participant; receiving the requested calendaring information; verifying based on processing of the received calendaring information that the participant has a hard stop relative to an end of the online collaboration session, wherein the hard stop is a point in time at which the participant can no longer participate in the online collaboration session; and presenting on a display of user equipment associated with the online collaboration system a hard stop indicator for the participant a first amount of time prior to the hard stop, wherein the hard stop indicator is displayed proximate a representation of the participant.

Example Embodiments

Figure 1:
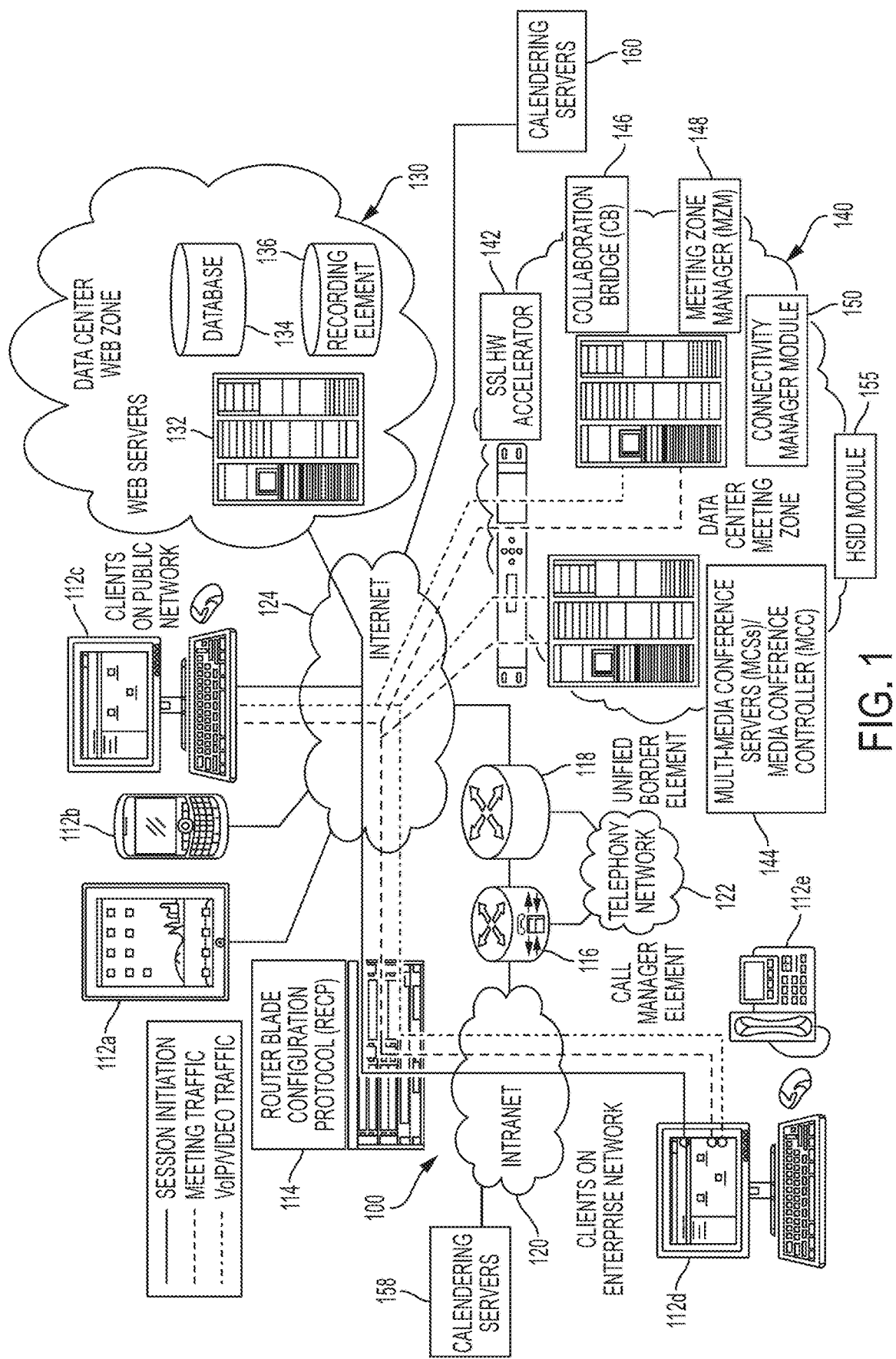
FIG. 1 is a simplified schematic diagram of a communication system in which a hard stop indicator in connection with a participant in a collaboration session may be displayed in accordance with embodiments of the present disclosure.

FIG. 1 is a simplified block diagram illustrating a communication system 100 in which a hard stop indicator in connection with a participant in a collaboration session may be displayed in accordance with embodiments described herein. In specific implementations, communication system 100 can be provisioned for use in generating, managing, hosting, and/or otherwise providing virtual meetings or collaboration sessions. In certain scenarios (many of which are detailed below), communication system 100 may be configured for retrieving dynamically assigned numerical identifiers for an endpoint for use in a meeting session. The architecture of communication system 100 is applicable to any type of conferencing or meeting technology such as video conferencing architectures (e.g., Telepresence™), web cam configurations, smartphone deployments, personal computing applications (e.g., Skype™) multimedia meeting platforms (e.g., MeetingPlace™, WebEx™, other virtual meeting client, etc.), collaboration systems (e.g., Spark™) desktop applications, or any other suitable environment in which video data is sought to be managed.

Communication system 100 may include any number of endpoints 112a-e that can achieve suitable network connectivity via various points of attachment. In this particular example, communication system 100 can include an Intranet 120, a telephony network 122, and an Internet 124, which (in this particular example) offers a pathway to a data center web zone 130 and a data center meeting zone 140. Telephony network 122 may include, among other things, a voice over Internet protocol (VoIP) gateway and a public switched telephone network (PSTN).

Data center web zone 130 includes a plurality of web servers 132, a database 134, and a recording element 136. Data center meeting zone 140 includes a secure sockets layer hardware (SSL HW) accelerator 142, a plurality of multimedia conference servers (MCSs)/media conference controller (MCC), which may comprise an MCU, 144, a collaboration bridge 146, a meeting zone manager 148, a connectivity manager module 150, and a hard stop indicator display (HSID) module 155. As a general proposition, each MCS/MCU can be configured to coordinate video and voice traffic for a given online meeting. Additionally, each MCC can be configured to manage the MCS/MCU from data center meeting zone 140. Each of endpoints 112a-e can be provisioned with one or more virtual meeting applications. A virtual meeting application may comprise one or more of, e.g., a virtual meeting client, a connectivity manager module, and an HSID module (operably coupled to one another). A virtual meeting client is operable (e.g., by an endpoint) to establish a connection to a virtual meeting session. The connectivity manager module is operable to facilitate connections and data transfer with between endpoints.

The communication system 100 further includes one or more calendaring servers 158, 160, respectively connected via intranet 120 and internet 124 for purposes that will be described in greater detail hereinbelow. As will be described, calendaring information for collaboration session participants (e.g., free/busy status) is made available to the HSID module 155 from the one or more of the calendaring servers 158, 160. In certain embodiments, one or more of the servers 158, 160, may be Microsoft™ Exchange™ servers. In all embodiments, servers 158, 160, include appropriate hardware (e.g., processors, memory, storage), software executable by the hardware, and one or more application programming interfaces ("APIs") to perform the functions described herein with regard to provision of free/busy status to the HSID module and other elements of the communication system 100.

Note that various types of routers and switches can be used to facilitate communications amongst any of the elements of FIG. 1. For example, a call manager element 116 and a unified border element 118 can be provisioned between telephony network 122 and Intranet 120. The call manager element is a network manager for IP phones. Also depicted in FIG. 1 are a number of pathways (e.g., shown as solid or broken lines) between the elements for propagating meeting traffic, session initiation, and voice over Internet protocol (VoIP)/video traffic.

Figure 2:
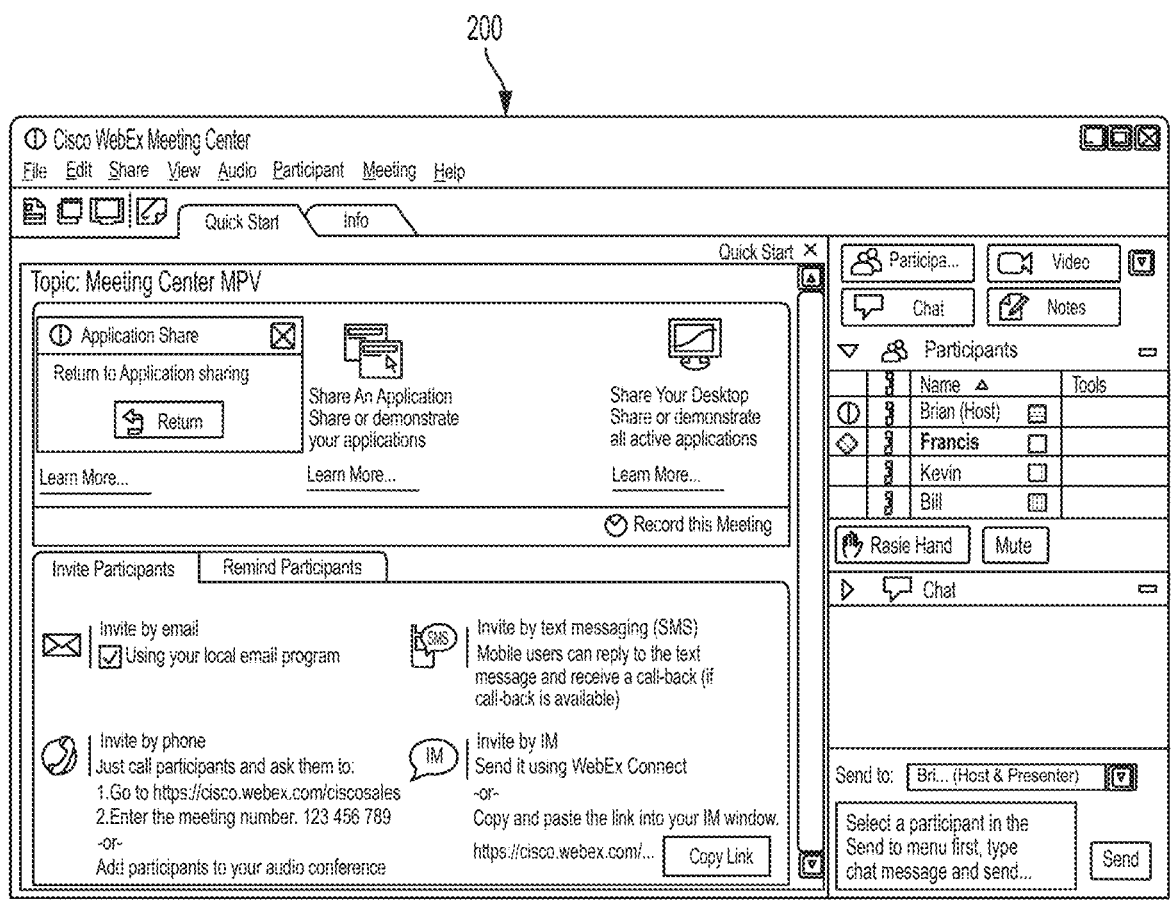
FIG. 2 is simplified diagram illustrating exemplary logic according to an embodiment of the present disclosure.
Figure 3:
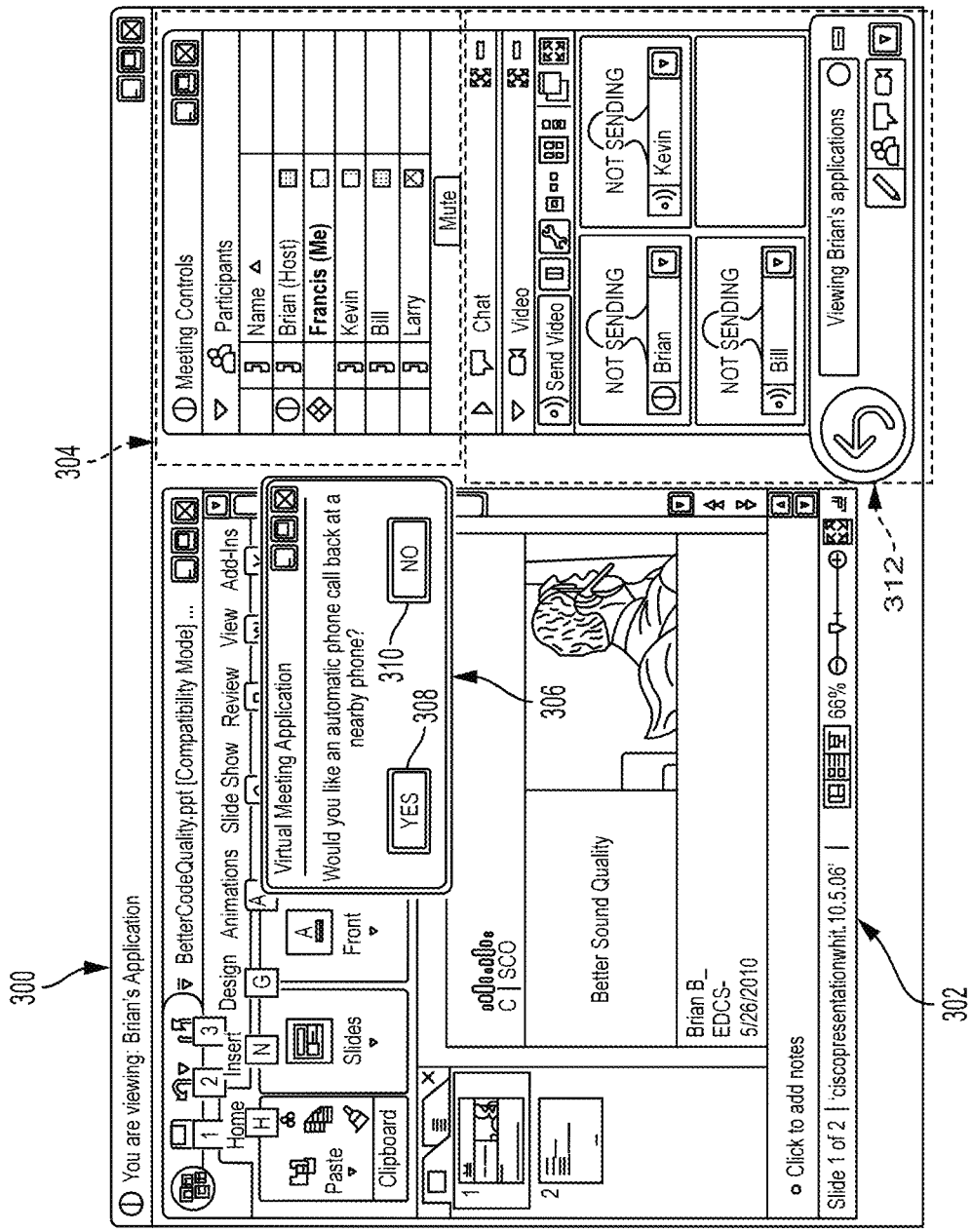
FIG. 3 is a simplified illustration of a user interface according to an embodiment of the present disclosure.

FIGS. 2-3 are simplified schematic diagrams illustrating example user interface graphics associated with one possible implementation of communication system 100. Turning specifically to FIG. 2, FIG. 2 is a simplified schematic diagram 200 associated with an example interface for conducting a virtual meeting using a virtual meeting application. This particular example relates to a virtual meeting initiation, specifically as the virtual meeting experience begins.

Semantically, the virtual meeting application is a client and server application. In some embodiments, the virtual meeting application may be a web-based application. A client module can be loaded onto an end user's endpoint via one or more webpages. A software module (e.g., a plug-in application, or a stand-alone application) can be delivered to a respective endpoint via the webpages. The software can be downloaded (or suitably updated) before participating in the meeting. If the software module is already resident on the end user's endpoint (e.g., previously downloaded, provisioned through any other type of medium (e.g., compact disk (CD)), then while attempting to participate in a virtual meeting, that software module would be called to run locally on the endpoint. This allows a given endpoint to establish a communication with one or more servers (e.g., provisioned at data center meeting zone 140 and/or data center web zone 130).

Static data can be stored in data center web zone 130. For example, the scheduling data, the login information, the branding for a particular company, the schedule of the day's events, etc. can all be provided in data center web zone 130. Once the meeting has begun, any meeting experience information can be coordinated (and stored) in data center meeting zone 140. For example, if an individual were to share a document, or to pass the ball (i.e., pass control of the meeting), then that meeting experience would be managed by data center meeting zone 140. In a particular implementation, data center meeting zone 140 is configured to coordinate the hard stop indicator display activities with endpoints 112*a-e* (e.g., via software modules).

In order to initiate joining a virtual meeting, an endpoint may connect to any point of attachment. Hence, a client (e.g., a virtual meeting client) can perform appropriate operations to join a previously scheduled virtual meeting.

The endpoint can be redirected to data center meeting zone 140 (as shown in FIG. 1). The meeting zone manager 148 can direct the endpoint to connect to a specific collaboration bridge server for joining the upcoming meeting. If the meeting has VoIP/video streams, then the endpoint also connects to a given server (e.g., an MCS) to receive those streams. The client is operably connected to the meeting (i.e., has completed joining the meeting) when client connected only by voice, only by video, or by integrated voice and video. Operationally, when the client joins the virtual meeting (e.g., and launches integrated voice and video) there are two connections being established to the collaboration bridge and to the MCS. For the collaboration bridge, one connection is established to send data and a second connection is established to receive data. For the MCS, one connection is established for control and the second connection is established for data. As the meeting begins, the meeting host may initially have control of the meeting (i.e., by default). The meeting is operational between the endpoint and other endpoint devices, which followed a similar initiation protocol to join the meeting.

FIG. 3 is a simplified schematic diagram 300 illustrating one example scenario in which a particular meeting participant is sharing a PowerPoint presentation during a virtual meeting. This participant can freely share his desktop such that other meeting participants can observe information that is resident on his local machine. In the example shown in FIG. 3, a user ("Francis"), has just joined a meeting hosted by Brian. Virtual meeting window 300 is an exemplary interface that is generated for display on an endpoint for Francis. Virtual meeting window 300 includes graphical representation of a communications data stream. The communications data stream includes any visual and/or audio data transmitted to (and received by) devices that are logged into a virtual meeting session. In this example, the communications data stream comprises presentation data 302, component 304, component 312, and user option window 306. The presentation data 302 corresponds to content displayed by a designated presenter within the meeting. Component 304 includes a list of participants that are currently logged into the virtual meeting. Component 312 includes communications data (e.g., video chat data, text chat data, or any other communication data, or graphical representations thereof, between users participating in the virtual meeting). User option window 306 includes user interface (UI) buttons 308 and 310 for confirming or denying, respectably, an option for an automatic call back at a phone (e.g., a phone detected by the user's device).

A meeting may have one or more designated presenters who share content in the meeting. In this case, there is only one presenter, Brian, who is also the meeting host. However, in other cases, the presenter is not the host and, instead, is a different participant in the meeting. Brian is sharing a slide show application including a presentation titled "Better Sound Quality" with other participants in the virtual meeting (as illustrated in presentation data 302). In other examples, presentation data 302 may be other types of documents (e.g., word processor, images, etc.), a desktop, or any other presentation content that is shared by a meeting participant. In one example, the presentation data 302 may be content uploaded by a user that is not the presenter. Presentation data is streamed to the participants that are logged into the virtual meeting session.

The list of users actively logged into the meeting is illustrated in user interface (UI) component 304. In this example, the list of users in the meeting is Brian, Francis, Kevin, Bill, and Larry. UI component 312 includes audio data, video data, chat data, or any other communication data (or graphical representation thereof) between the users participating in the virtual meeting. The video chat corresponds to communications between the users in the list of participant. In this case, the user (Francis) has just joined the meeting and is viewing Brian's shared application via presentation data 302.

When Francis joins the meeting, his device only receives the graphical data shown in window 300. His device does not receive any audio data from the meeting (though audio data is being generated by other users in the meeting) due, in part, to not being connected to the audio portion of the meeting (e.g., he has not placed a phone call into a meeting phone number that corresponds to the meeting). All of the other users have joined the audio portion of the conference call, as indicated by a telephone icon adjacent to the name of each of the other users. Because Francis is not yet connected to the audio portion, no telephone icon is adjacent to his name.

The connectivity manager module 150 generates an option 306, which provides an option for Francis (using his device) to join the audio portion of the meeting. Option 306 includes the message "Would you like an automatic call back at a nearby phone?" and provides input options of "YES" using UI button 308 and "NO" using UI bottom 310. If the user selects "NO" using UI bottom 310 (or by pressing the "X" in the upper-right corner of window 306), the system may prompt the user for manual input of a call-back number and/or may present a phone number associated with the virtual meeting for the user to call.

In accordance with features of embodiments described herein, it will be assumed that a collaboration system, such as Cisco Telepresense™, Cisco WebEx™, and Cisco Spark™, for example, has access to the calendaring system (e.g., Microsoft Exchange™, Google Calendar™, Apple iCal™) of each meeting participant, e.g., via an Application Programming Interface ("API") of the calendaring system. In embodiments illustrated herein, calendaring system includes one or more of calendaring servers 158, 160 (FIG. 1). In accordance with certain embodiments, for each participant that is determined by the HSID module 155 (as described below) to have a hard stop at the end of a current collaboration session (referred to herein as "hard stop participants"), a visual indicator will be displayed in association with the participant a configurable amount of time X prior to end of the collaboration session to notify other participants that the hard stop participant has a hard stop. In one example, X may be equal to 10 minutes, such that the hard stop indicator is implemented during the 10 minutes immediately prior to the scheduled end of the session (i.e., during the final X=10 minutes of the session). The hard stop indicator may be implemented by "ghosting" (i.e., rendering progressively more transparent) the image of each participant determined to be a hard stop participant beginning the amount of time X before the end of the meeting, creating the illusion that each hard stop participant is slowly departing the meeting. Alternatively, an icon may be displayed next to each hard stop participant's name in the meeting roster (e.g., in WebEx™) or proximate to the image of each hard stop participant (e.g., in Telepresence™) beginning an amount of time X prior to the end of the meeting (i.e., during the final X minutes of the session). The appearance of the icon could change over the time period X, serving as a visual reminder of how soon the hard stop will occur.

For example, using a well-recognized traffic light analogy, at a time X before the end of the meeting, the icon could be displayed as a green icon, then at a later time Y transition to yellow, then at a still later time Z transition to red as the end of the meeting approaches. It will be recognized that different colors may be used and that the values of X, Y, and Z may be configurable. Alternatively, the icon could be presented as a timer showing exactly the amount of time before the hard stop or an hour glass illustrating a portion of the total time period X remaining before the hard stop. Again, it will be recognized that the specific examples of types of icons and indicators described herein are for illustrative purposes only and that other types of icons and indicators may be used without departing from the spirit of the scope of the invention. It should also be noted that while the hard stop for a particular user will typically coincide with the scheduled session end, embodiments described herein are equally applicable to situations in which a particular participant's hard stop occurs prior to the scheduled end of the session, in which case the hard stop indicator may be displayed beginning X minutes prior to the hard stop.

In certain embodiments, facial recognition capabilities are included in the data center meeting zone 140 (e.g., in the MCS/MCC 144) that may be utilized to identify a person's face within an image, extract the face from the rest of the scene, and compare it to a catalog of facial images stored in a database (e.g., in the MCS/MCC 144). For example, such facial recognition capabilities may be implemented using FaceIt™, available from Identix, Inc., of Minnetonka, Minn., or using a facial recognition application sold by Viisage Technology of Littleton, Mass. In example embodiments, a captured ("snapshot") facial image of a conference participant may be taken and various characteristics of the facial image, such as the distance between the eyes, the length of the nose, the outline of the face, and the angle of the jaw, may be measured to create a unique "template" of the facial image. This template may then be stored in the associated database as an object. Using templates, an image captured from a collaboration session may be compared with a stored image to produce a score indicative of how similar the two images are to one another. In certain implementations, different snapshots may be taken of a conference participant as the person slightly moves (or by taking a smaller number of snapshots from a stereo camera) and comparing them against known facial eigenvectors (a series of facial pictures from different angles that can uniquely identify a person) associated with a profile of each person. In one embodiment, the system matches each of the outlined participant faces in the video conference meeting against the stored catalogue or corporate directory in order to identify the participants. This matching may occur either at the start of a conference session as each person or group joins in.

Using the facial recognition techniques described above, each participant in a conference room telepresence system and their placement with in the video frame may be identified. Alternatively, participants using WebEx or Spark, for example, are identified when they join the video conferencing session. The identity of each of the participants, however derived, is used to access availability information from their respective calendar, which information is used to determine whether the user has a hard stop at (or prior to) the scheduled meeting end.

Figure 4:
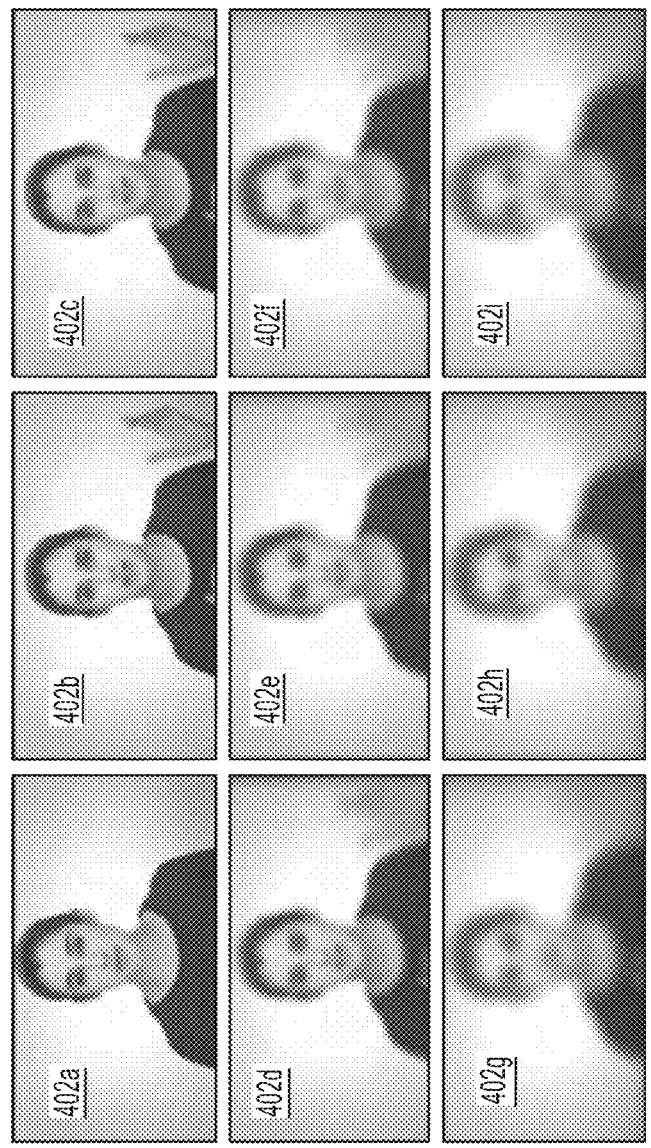
FIG. 4 is an illustration of an example of a hard stop indicator for display in connection with a participant in a collaboration session in accordance with embodiments of the present disclosure.

FIG. 4 illustrates the concept of "ghosting" described above. FIG. 4 includes a plurality of images 402a-402i of a hard stop participant over time period X with the image 402a being the fully discernable image of the participant as displayed at the beginning of the time period and each successive image 402b-402i being progressively more transparent until the image disappears altogether at the hard stop. It will be recognized that the ghosting effect described and illustrated herein could be advantageously employed in addition or as an alternative to another type of hard stop indicator, such as a colored or numeric (timer) icon.

Figure 5:
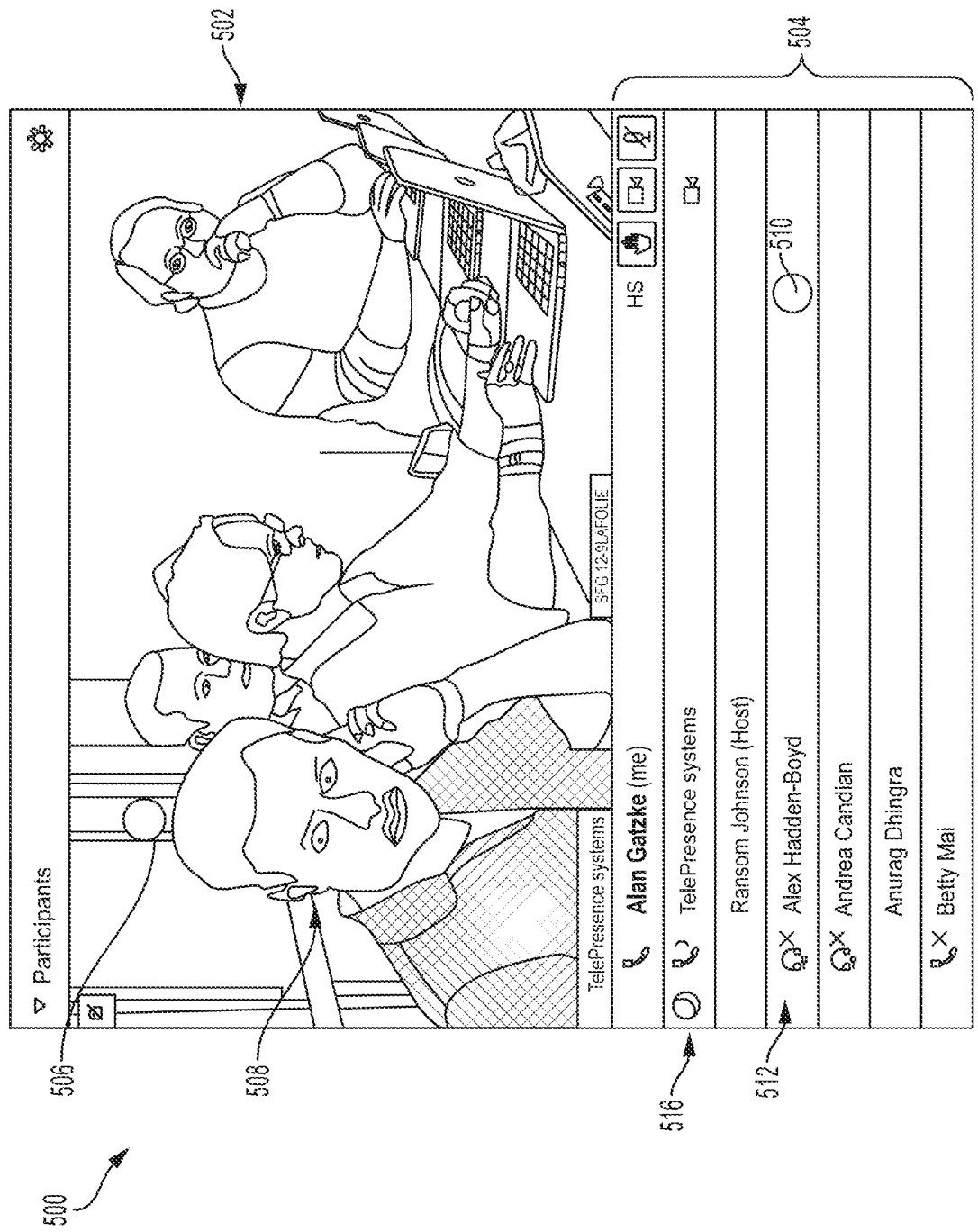
FIG. 5 is an illustration of an example of an alternative hard stop indicator for display in connection with a participant in a collaboration session in accordance with embodiments of the present disclosure.

FIG. 5 illustrates use of a hard stop indicator comprising a colored icon in connection with participants in a collaboration session, wherein some portion of the participants are participating in the collaboration session using, for example, a Telepresence™ system, and some portion are participating in the collaboration session using, for example, WebEx™. As shown in FIG. 5, a video display 500 of the collaboration session as shown on an endpoint of one of the participants includes a video image 502 of participants who are participating via the Telepresence™ system and a roster 504 listing the name of participants participating in the session via WebEx™. As shown in FIG. 5, a hard stop indicator comprising an icon 506 is displayed in association with (i.e., over the head of) a participant 508 indicating that the participant is a hard stop participant and needs to leave the session within a time period X. Similarly, an icon 510 is displayed in association with an entry 512 in the roster 504 indicating that the named participant (i.e., Alex Hadden-Boyd) is also a hard stop participant and needs to leave the session within the time period X.

Telepresence systems in which the entire room is unavailable in an immediately subsequent timeslot due to its being booked by another user would also benefit from embodiments described herein. Similar to the situations described above in which a conference participant has a hard stop, a visual indicator could notify conference attendees that the room itself has an upcoming hard stop. The same types of visual indicators could be used for this purpose, with a colored dot next to an entry 516 for the Telepresence system in the roster 504, a colored dot in the corner of the video image 502 corresponding to the particular Telepresence system, and/or a ghosting effect applied to the entire video image 502 corresponding to the particular Telepresence system.

Figure 6:
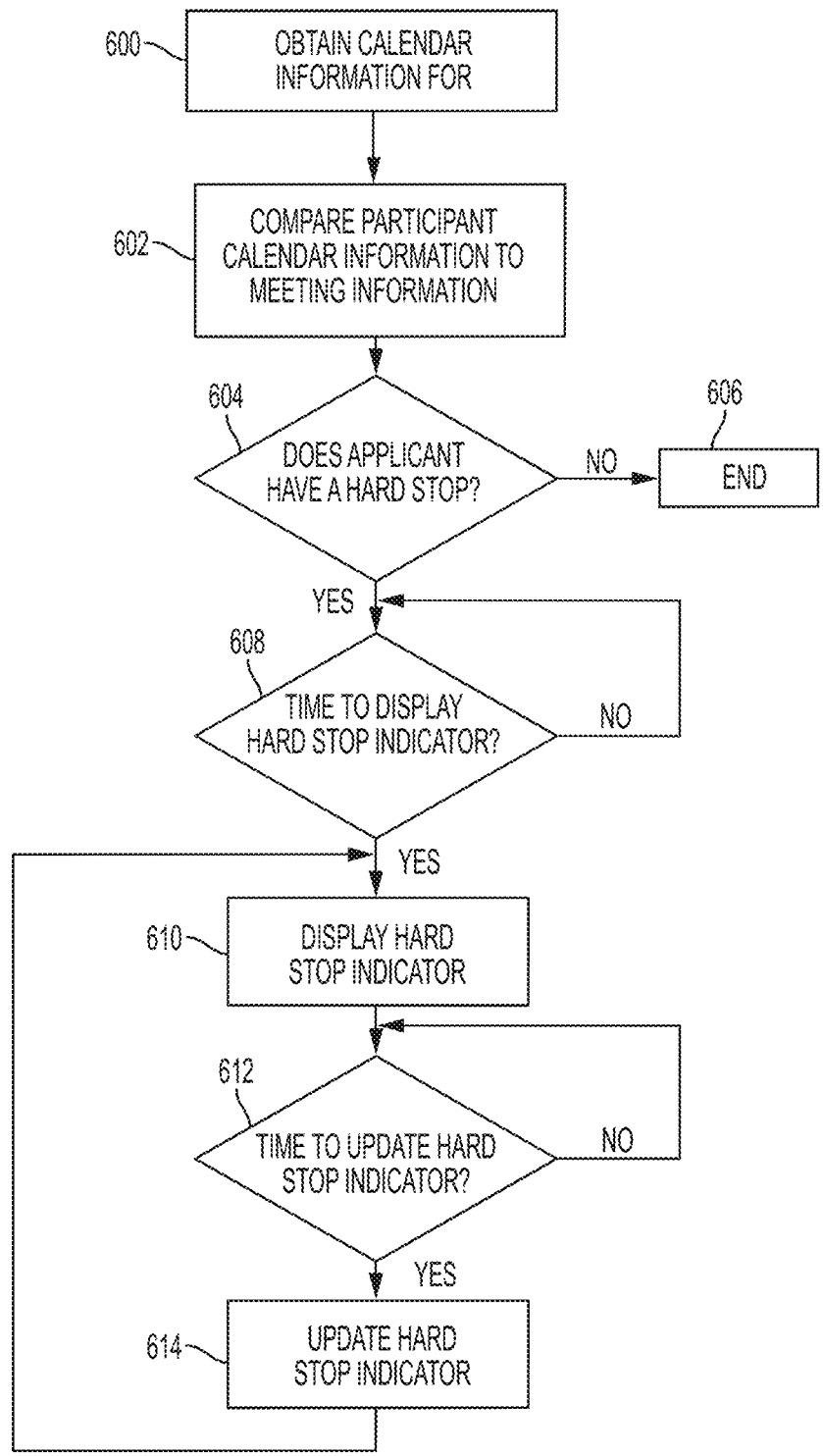
FIG. 6 is a flowchart illustrating steps that may be executed in a technique for displaying a hard stop indicator in connection with a participant in a collaboration session in accordance with embodiments of the present disclosure.

FIG. 6 illustrates a flowchart showing steps that may be executed in displaying a hard stop indicator in connection with a participant in a collaboration session in accordance with embodiments described herein. It will be recognized that one or more of the steps illustrated in FIG. 6 may be executed in connection with each participant in a collaboration session. Referring again to FIG. 6, in step 600, calendar information for the participant is obtained from participants calendaring system. In certain embodiments, calendar information will include free/busy information obtained from one or more calendaring servers comprising calendaring system via one or more APIs of the server(s) provided for such purposes. In step 602, the participant's calendar information is compared with the session information (i.e., the meeting date and time) and in step 604, a determination is made whether the participant has a hard stop at (or possibly before) the end scheduled end of the session. If a negative determination is made in step 604, meaning the participant does not have a hard stop at or before the scheduled session end, execution terminates in step 606. If a positive determination is made in step 604, meaning the participant does have a hard stop at or before the scheduled session end, execution proceeds to step 608.

In step 608, a determination is made whether it is time to display the hard stop indicator. In particular, a determination is made at this step whether X minutes remain until the scheduled end of the session (or alternatively, whether X minutes remain before the participant's hard stop, if that point is prior to the scheduled end of the session). Execution remains at step 608 until a positive determination is made, in which case execution proceeds to step 610. In step 610, the hard stop indicator is displayed in connection with the participant. As previously noted, one or more of any number of different hard stop indicators may be used to implement the teachings of embodiments described herein. In step 612, a determination is made whether it is time to update the hard stop indicator. For example, for the "ghosting" type of hard stop indicator, updating may occur every S seconds, while for the traffic light type of hard stop indicator, updating may occur every M minutes (as dictated by values of X, Y, and Z described above), and for the timer type of hard stop indicator, updating may occur every minute (or more frequently, depending on how much information is displayed on the timer). Execution remains at step 612 until a positive determination is made, until the hard stop occurs, and/or until the session ends. Once a positive determination is made in step 612, execution proceeds to step 614, in which the hard stop indicator is updated. For example, in connection with such hard stop indicators as the ghosting technique described above, the "updating" may include making the image of the participant slightly more transparent. In connection with the "traffic light" type of hard stop indicator, the "updating" may include changing the color of the hard stop indicator. Finally, in connection with the timer type of hard stop indicator, the "updating" may include updating the time reflected on the timer. Upon completion of step 614, execution returns to step 610.

Figure 7:
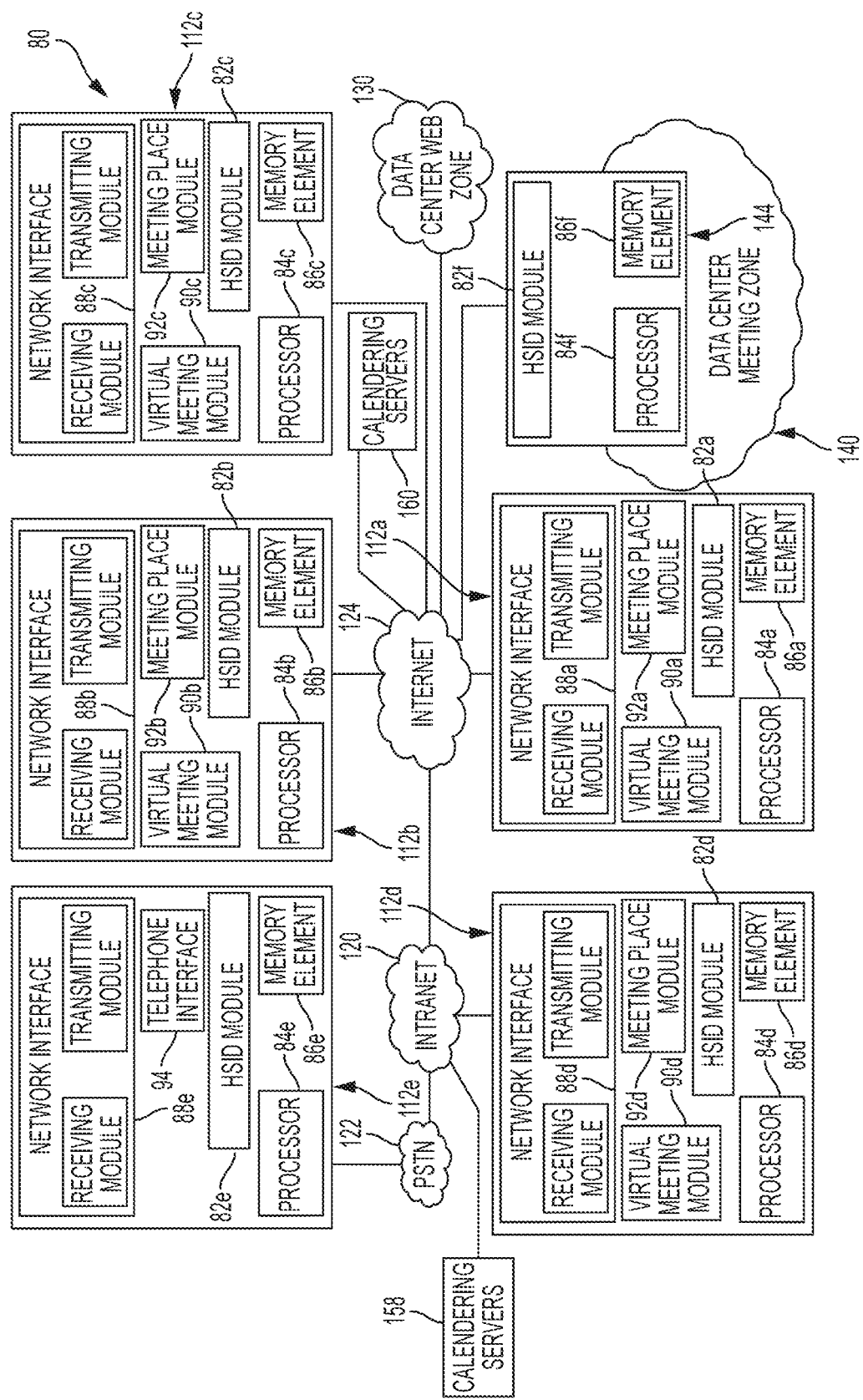
FIG. 7 is a simplified schematic diagram illustrating possible details related to an example infrastructure of the communication system in accordance with one embodiment.

FIG. 7 is a simplified block diagram illustrating one possible example of infrastructure associated with communication system 100. Each of endpoints 112a-e are provisioned with a respective HSID module 82a-e, a respective processor 84a-e, a respective memory element 86a-e, a respective virtual meeting module 90a-e (e.g., a virtual meeting application), a respective Meeting Place module 92a-e, and a respective network interface 88a-e, which includes a respective receiving module and a respective transmitting module for exchanging data (e.g., for exchanging packets in a network environment). Endpoint 112e also includes a telephony module for communicating with telephony network 122. Additionally, FIG. 7 illustrates an example implementation of MCSs/MCC 144 that is similarly provisioned with an HSID module 82f, a processor 84f, and a memory element 86f.

In one example implementation, each endpoint 112a-e and/or MCSs/MCC 144 includes software (e.g., as part of HSID modules 82a-f) to achieve or to support the endpoint identification functions, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the FIGURES may include any suitable algorithms, hardware, software, components, modules, interfaces, or objects that facilitate these endpoint identification operations.

It is imperative to note that FIG. 7 is indicative of just one, of the multitude, of example implementations of communication system 100. Any of the modules or elements within endpoints 112a-e and/or MCSs/MCC 144 may readily be replaced, substituted, or eliminated based on particular needs. Furthermore, although described with reference to particular scenarios, where a given module (e.g., virtual meeting modules 90a-e, Meeting Place modules 92a-e, HSID modules 82a-f, etc.) is provided within endpoints 112a-e or MCSs/MCC 144, any one or more of these elements can be provided externally, or consolidated and/or combined in any suitable fashion. In certain instances, certain elements may be provided in a single proprietary module, device, unit, etc. in order to achieve the teachings of the present disclosure.

Endpoints 112a-e are representative of any type of client or user wishing to participate in a meeting session in communication system 100 (e.g., or in any other online platform). Furthermore, endpoints 112a-e can be associated with individuals, clients, customers, or end users wishing to participate in a meeting session in communication system 100 via some network. The term 'endpoint' is inclusive of devices used to initiate a communication, such as a computer, a personal digital assistant (PDA), a laptop or electronic notebook, a cellular telephone of any kind, an iPhone, an IP phone, a Blackberry, a Google Droid, an iPad, a tablet, or any other device, component, element, or object capable of initiating voice, audio, video, media, and/or data exchanges within communication system 100. Endpoints 112a-e may also be inclusive of a suitable interface to the human user, such as a microphone, a display, or a keyboard or other terminal equipment. Endpoints 112a-e may also be any device that seeks to initiate a communication on behalf of another entity or element, such as a program, a proprietary conferencing device, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

MCSs/MCC 144 and web servers 132 are network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, load balancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 144 and web servers 132 are servers that can interact with each other via the networks of FIG. 1.

Intranet 120, telephony network 122, and Internet 124 represent a series of points or nodes of interconnected communication paths for receiving and transmitting packets of information that propagate through communication system 100. These networks may offer connectivity to any of the devices or endpoints of FIG. 1. Moreover, Intranet 120, telephony network 122, and Internet 124 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 120, telephony network 122, and Internet 124 can support a transmission control protocol (TCP)/IP, or a user datagram protocol (UDP)/IP in particular embodiments of the present disclosure; however, Intranet 120, telephony network 122, and Internet 124 may alternatively implement any other suitable communication protocol for transmitting and receiving data packets within communication system 100. Note also that Intranet 120, telephony network 122, and Internet 124 can accommodate any number of ancillary activities, which can accompany a meeting session. This network connectivity can facilitate all informational exchanges (e.g., notes, virtual whiteboards, PowerPoint presentations, e-mailing, word-processing applications, etc.). Along similar reasoning, Intranet 120, telephony network 122, and Internet 124 can foster all such communications and, further, be replaced by any suitable network components for facilitating the propagation of data between participants in a conferencing session.

It should also be noted that endpoints 112a-e and MCSs/MCC 44 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with talking stick operations. In a general sense, the arrangement depicted in FIG. 7 may be more logical in its representations, whereas a physical architecture may include various permutations/combinations/hybrids of these elements.

Note that in certain example implementations, the endpoint identification functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 7) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 7) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, HSID modules 82a-f includes software in order to achieve the functions outlined herein, such as those illustrated in FIG. 6. These activities can be facilitated by MCSs/MCC 144 and/or the various endpoints 112a-e. MCSs/MCC 144 and/or endpoints 112a-e can include memory elements for storing information to be used in achieving the intelligent endpoint identification functions, as outlined herein. Additionally, MCSs/MCC 144 and/or endpoints 112a-e may include a processor that can execute software or an algorithm to perform the endpoint identification controls, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Embodiments described herein enable users to continue to use a particular telepresence product in precisely the manner to which they have become accustomed, but results in an improved experience without any action required on the part of the user. Unlike the aforementioned "pinning" of a secondary participant, embodiments described herein are executed automatically and require no action on the part of the user; in fact, it is anticipated that the effects will be transparent to the user. Rather, embodiments described herein accentuate and amplify the actions that a user is already taking; that is, paying particular attention to a participant. As a result, participants to which the user is paying particular attention automatically and transparently because more prominently featured in the video conferencing session and more often included in the layout, seamlessly improving utility without explicit action on the user's part.

Embodiments described herein also potentially allow for dynamic changing of the layout itself. In particular, by automatically changing or by prompting the user to do so when measurements of their interest suggest that they would like to do so, a user would experience a big increase in the utility of the feature.

In summary, embodiments described herein use gaze tracking to determine which non-speaking participants a user is paying particular attention to and then weights the selection algorithm to maximize the amount of time that participant and/or those participants are visible to the user. This ensures that each user ends up seeing the subset of participants that they are most interested in seeing. The technique can also help provide information to weight message prominence in cloud systems or the like.

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of rooms and sites, as well as more complicated/sophisticated arrangements and configurations. Accordingly, the examples provided herein should not limit the scope or inhibit the broad teachings of communication system 100 as potentially applied to a myriad of other architectures. Additionally, although described with reference to particular scenarios where MCSs/MCC 144 resides in a particular physical location, MCSs/MCC 144 can reside in any location, provided it has some connectivity to a suitable network.

It is also important to note that the steps discussed with reference to FIGS. 1-7 illustrate only some of the possible scenarios that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in virtual meeting and Meeting Place conferencing environments or arrangements, the present disclosure may be used in any online environment that could benefit from such technology. For example, in certain instances, computers that are coupled to each other in some fashion can utilize the teachings of the present disclosure (e.g., even though participants would be in a face-to-face arrangement). The endpoint identification could still be respected by those meeting participants: even when they are physically co-located. Virtually any configuration that seeks to intelligently identify endpoint and connection users could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims. The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

Note that all optional features of the apparatus described above may also be implemented with respect to the method or process described herein and specifics in the examples may be used anywhere in one or more embodiments.

In accordance with the well-established principle that an "applicant is entitled to be his or her own lexicographer," MPEP 2111.01(IV), citing In re Paulson, 30 F.3d 1475, 1480 (Fed. Cir. 1994), certain terms have been expressly defined herein. It is expressly intended that those terms have the definitions supplied, and that they not be given any interpretation inconsistent with those definitions.

What is claimed is:

1. A method comprising:
   requesting, from a calendaring system, calendaring information for a participant in an online collaboration session, wherein the calendaring information includes information indicating free time and busy time for the participant;
   receiving the calendaring information;
   verifying, based on processing of the received calendaring information, that the participant has a hard stop relative to an end of the online collaboration session, wherein the hard stop is a point in time at which the participant can no longer participate in the online collaboration session; and
   during the online collaboration session, presenting, on a display of a user equipment associated with the online collaboration session, a graphical user interface including adding a hard stop indicator for the participant for a first amount of time prior to the hard stop, wherein the hard stop indicator is displayed in a proximity of a representation of the participant,
   wherein the representation of the participant comprises an image of the participant and presenting the hard stop indicator comprises displaying the image of the participant progressively more transparently during the first amount of time until the hard stop occurs.

2. The method of claim 1 further comprising updating an image of the hard stop indicator a second amount of time prior to the hard stop, wherein the second amount of time is smaller than the first amount of time.

3. The method of claim 1, wherein the hard stop indicator comprises a colored shape displayed proximate to the representation of the participant.

4. The method of claim 3 further comprising changing a color of the colored shape a second amount of time prior to the hard stop, wherein the second amount of time is smaller than the first amount of time.

5. The method of claim 1, wherein the hard stop indicator comprises a countdown timer and wherein a value displayed on the countdown timer at any given time indicates an amount of time remaining before the hard stop.

6. The method of claim 1, wherein the hard stop coincides with the end of the online collaboration session.

7. The method of claim 1, wherein the hard stop is scheduled to occur prior to the end of the online collaboration session.

8. One or more non-transitory tangible media that includes code for execution and when executed by a processor is operable to perform operations comprising:
   requesting, from a calendaring system, calendaring information for a participant in an online collaboration session, wherein the calendaring information includes information indicating free time and busy time for the participant;
   receiving the calendaring information;
   verifying based on processing of the calendaring information that the participant has a hard stop relative to an end of the online collaboration session, wherein the hard stop is a point in time at which the participant can no longer participate in the online collaboration session; and
   during the online collaboration session, presenting, on a display of user equipment associated with the online collaboration session, a graphical user interface including adding a hard stop indicator for the participant for a first amount of time prior to the hard stop, wherein the hard stop indicator is displayed in a proximity of a representation of the participant,
   wherein the representation of the participant comprises an image of the participant and presenting the hard stop indicator comprises displaying the image of the participant progressively more transparently during the first amount of time until the hard stop occurs.

9. The media of claim 8 further comprising updating an image of the hard stop indicator a second amount of time prior to the hard stop, wherein the second amount of time is smaller than the first amount of time.

10. The media of claim 8, wherein the hard stop indicator comprises a colored shape displayed proximate to the representation of the participant.

11. The media of claim 10, further comprising changing a color of the colored shape a second amount of time prior to the hard stop, wherein the second amount of time is smaller than the first amount of time.

12. The media of claim 8, wherein the hard stop indicator comprises a countdown timer and wherein a value displayed on the countdown timer at any given time indicates an amount of time remaining before the hard stop.

13. An apparatus comprising:
a memory element configured to store data; and
a processor operable to execute instructions associated with the data,
wherein the processor is configured for:
requesting, from a calendaring system, calendaring information for a participant in an online collaboration session, wherein the calendaring information includes information indicating free time and busy time for the participant;
receiving the calendaring information;
verifying based on processing of the calendaring information that the participant has a hard stop relative to an end of the online collaboration session, wherein the hard stop is a point in time at which the participant can no longer participate in the online collaboration session; and
during the online collaboration session, presenting, on a display of a user equipment associated with the online collaboration session, a graphical user interface including adding a hard stop indicator for the participant for a first amount of time prior to the hard stop, wherein the hard stop indicator is displayed in a proximity of a representation of the participant,
wherein the representation of the participant comprises an image of the participant and presenting the hard stop indicator comprises displaying the image of the participant progressively more transparently during the first amount of time until the hard stop occurs.

14. The apparatus of claim 13, wherein the processor is further configured for updating an image of the hard stop indicator a second amount of time prior to the hard stop and wherein the second amount of time is smaller than the first amount of time.

15. The apparatus of claim 13, wherein the hard stop indicator comprises a colored shape displayed proximate to the representation of the participant.

16. The apparatus of claim 13, wherein the hard stop indicator comprises a countdown timer and wherein a value displayed on the countdown timer at any given time indicates an amount of time remaining before the hard stop.

17. The media of claim 8, wherein the hard stop is scheduled to occur prior to the end of the online collaboration session.

18. The apparatus of claim 13, wherein the hard stop is scheduled to occur prior to the end of the online collaboration session.

19. The method of claim 1, wherein the online collaboration session is between the participant and at least one other participant and wherein the user equipment is associated with one of the at least one other participant of the online collaboration session.

20. The method of claim 1, further comprising:
identifying the participant and at least one other participant in the online collaboration session based on a facial recognition; and
determining whether each of the participant and the at least one other participant has the hard stop for participating in the online collaboration session based on the identifying.

* * * * *

UNITED STATES PATENT AND TRADEMARK OFFICE
CERTIFICATE OF CORRECTION

PATENT NO. : 10,552,801 B2  
APPLICATION NO. : 15/277848  
DATED : February 4, 2020  
INVENTOR(S) : Alan D. Gatzke et al.

Page 1 of 1

It is certified that error appears in the above-identified patent and that said Letters Patent is hereby corrected as shown below:

In the Claims

Claim 8, Column 14, Line 57, please replace "participant fora" with --participant for a--

Signed and Sealed this  
Twenty-fourth Day of March, 2020

Andrei Iancu  
*Director of the United States Patent and Trademark Office*